United States Patent [19]

Swedo et al.

[11] Patent Number: 5,102,972
[45] Date of Patent: Apr. 7, 1992

[54] POLYHYDRIC PHENOL CHAIN EXTENDERS FOR CERTAIN BISMALEIMIDE RESIN

[75] Inventors: Raymond J. Swedo, Mt. Prospect; Joseph J. Zupancic, Bensenville, both of Ill.

[73] Assignee: Allied-Signal Inc., Morris Township, Morris County, N.J.

[21] Appl. No.: 557,232

[22] Filed: Jul. 25, 1990

Related U.S. Application Data

[63] Continuation-in-part of Ser. No. 306,002, Feb. 2, 1989, abandoned.

[51] Int. Cl.⁵ .............................................. C08G 73/12
[52] U.S. Cl. ................................... 528/170; 526/212; 526/262; 528/125; 528/159; 528/164; 528/317; 528/321; 528/322
[58] Field of Search ............... 528/170, 322, 321, 159, 528/164, 125, 317; 526/262, 212

[56] References Cited

U.S. PATENT DOCUMENTS 4,464,520  8/1984  Adams et al. ..................... 526/262

FOREIGN PATENT DOCUMENTS 61145-225A  12/1984  Japan.
1058976  5/1982  U.S.S.R.

OTHER PUBLICATIONS

Rakoutz et al. "Siloxane Modification of Bismaleimide Resins" Polymer Journal, vol. 19, No. 1, pp. 173–184 (1987).

Stenzenberger et al. "Toughened Bismaleimides: Concepts, Achievements, Directions", 19th Int'l SAMPE Tech. Conf. Oct. 13-15, 1987.

Renner, "The Reaction of Phenols with N-substituted Maleimides" Chemical Abstracts, vol. 89, 1978.

*Primary Examiner*—Harold D. Anderson
*Attorney, Agent, or Firm*—Eugene I. Snyder; Harold N. Wells; Gerard P. Rooney

[57] ABSTRACT

A class of di-ortho-substituted bismaleimides undergo uncatalyzed Michael addition with polyhydric phenols to afford chain-extended bismaleimides having a significantly wider processing window than the non-extended parent. The fully cured resins show improved fracture toughness, generally have comparable or superior dielectric constant and dielectric loss, and show no degradation in other properties such as resistance to moisture, to methylene chloride, and coefficient of thermal expansion.

27 Claims, No Drawings

POLYHYDRIC PHENOL CHAIN EXTENDERS FOR CERTAIN BISMALEIMIDE RESIN

REFERENCE TO RELATED APPLICATIONS

This is a continuation-in-part of U.S. patent application Ser. No. 07/306,002, filed Feb. 2, 1989, now abandoned.

BACKGROUND OF THE INVENTION

In recent years polyimides have had increasing use as thermosetting resins in high performance applications, as the matrix resin for reinforced composites in spacecraft and missiles and for syntactic foams, as well as for laminates in printed circuit boards and other electronic applications. When polyimide resins are cured they generally afford a polymer with a high glass transition temperature and excellent chemical (environmental) stability with particularly good resistance to moisture and to oxidative degradation at elevated temperatures. However, cured resins typically are extensively crosslinked leading to products which are very brittle, that is, having low fracture toughness.

Many bismaleimides manifest the unfortunate property of beginning to polymerize at a temperature which is at or just above the melting point of the monomer, that is, the temperature differential between melting and onset of polymerization is small. As a result it is difficult to maintain the uncured resin in a fluid state, and the accompanying difficulty in attaining a homogeneous melt leads to well documented processing difficulties. The patentee of U.S. Pat. No. 4,464,520 addressed this problem and provided a class of bismaleimides (BMIs) with increased pot life, therefore a "larger processing window". However, the compositions taught there still afforded cured polymers which were brittle.

Because the brittleness of the cured product arises from extensive crosslinking during polymerization, many efforts have been made to reduce the crosslink density in the cured product to afford toughened BMIs without adversely impinging on other desirable properties. See H. D. Stenzenberger et al., 19th International SAMPE Technical Conference, Oct. 13-15, 1987, pages 372-85. Among approaches to toughening BMIs, the authors include the reaction of o,o'-dialkyl bisphenol A with a BMI. However, they state that all dialkyl phenyl compounds react via an "ene" type reaction in which the alkyl moiety rather than the hydroxyl group reacts with the BMI.

One general approach has been to react BMI monomers at their carbon-carbon double bonds with certain reactive bifunctional reagents having active hydrogens to afford Michael addition products. This reaction and the resulting Michael adduct may be exemplified using a diamine as the reactive bifunctional reagent by the equation,

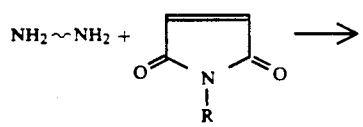

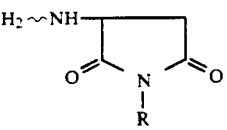

As the foregoing equation shows, Michael addition reduces double bond density in the BMI monomer (or oligomer) resulting in a lower crosslink density in the cured product. The diamine also can be viewed as a chain extender in addition to its function of reducing crosslinking density.

Michael addition generally is a base-catalyzed reaction, and since amines as bases serve as their own catalysts this is one reason why amines usually are quite reactive in Michael addition. Where alcohols are used, the reaction with nitrogen-substituted maleimides requires a base catalyst as an additional component; A. Renner et al., *Helv. Chim. Acta.*, 61, 1443 (1978). These workers also have given an instance of the reaction via Michael addition of a polyhydric phenol (bisphenol A) to a typical BMI monomer, with chain extension requiring a discrete base catalyst. However, the use of a third component as a catalyst along with a chain extender polyhydric phenol generally is undesirable since the resulting product retains the catalyst as a component which might significantly degrade the performance of the final cured resin. The necessity of using basic catalysts for chain extension with polyols is particularly unfortunate, since a significant advantage of polyols is that they are non-carcinogenic whereas aromatic diamines used as chain extenders often are carcinogenic. The reaction between polyols and the carbon-carbon double bonds of typical BMIs in the absence of catalysts has been believed to be insignificant as the prior art demonstrates.

Hitachi Chemical in published patent application J61145225-A shows the reaction of a mixture of a BMI, a polyol, a trialkylisocyaurate, and an acid catalyst. It is believed that the hydroxyl groups of the polyol are not reacting with carbon-carbon bond of the bismaleimide, but instead the polyol reacts with the trialkyl isocyanurate while the BMI undergoes homopolymerization. Rakoutz and Balme in *Polymer Journal*, Vol 19, No. 1 pp. 173–184 (1987) show a similar reaction.

Soviet Union published application SU1058976-A shows the reaction of an oligophenoldisulfide with a bismaleimide. The oligophenoldisulfides are stated to have a molecular weight of 300–1030 and to cure by breaking the disulfide groups followed by reaction of the radicals formed with bismaleimide. While the applicants suggest that hydroxyl groups could be connecting to the carbon-carbon double bond of the BMI, where a Novolac is used (Example 11) the flex strength is lower than with the BMI alone (Example 12) and much lower than those examples where a significant proportion of the oligophenoldisulfide is used. Thus, it is concluded that the reaction of the sulfur-containing radicals is responsible for the improved performance and the effect of reacting hydroxyl groups with the BMI is small. Thus, one skilled in the art could conclude that the reaction of Novolacs with conventional BMIs in the absence of a catalyst are not significant.

The bismaleimides of U.S. Pat. No. 4,464,520, representative of which is the structure

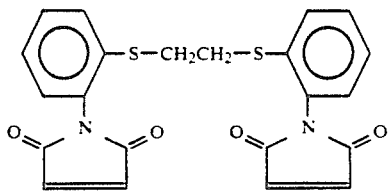

could be expected to undergo Michael addition sluggishly, if at all, because of the relatively hindered nature of the maleimide double bond. Quite unexpectedly it was found that not only did such materials undergo Michael addition, but in fact they reacted facilely with the less reactive polyhydric phenols. But not only did the polyhydric phenols readily react with the aforementioned BMIs, they did so in an uncatalyzed reaction, that is, in the absence of a base catalyst. This totally unexpected behavior afforded cured resins containing no performance-degrading components and led us to examine some relevant performance characteristics of representative chain-extended cured resins. We have found that relative to the parent cured resin, chain extension generally has reduced brittleness and improved the toughness of the cured resin, with the latter having a superior dielectric constant and loss factors and comparable coefficients of thermal expansion and chemical resistance. Most surprisingly, the chain-extended BMIs have wider processing windows than either the parent or diamine chain-extended BMI resins.

SUMMARY OF THE INVENTION

The purpose of this invention is to prepare bismaleimide resins which are chain extended with polyhydric phenols in the absence of a catalyst. An embodiment comprises the reaction of the carbon-carbon double bonds of certain di ortho-substituted BMIs, as exemplified by 1,2-bis(2-maleimidophenylthio)ethane, with the hydroxyl groups of polyhydric phenols in the absence of any third component as catalyst. In a more specific embodiment the polyhydric phenol is a dihydric phenol. In a still more specific embodiment the dihydric phenol is hexafluorobisphenol A. Another embodiment is a thermosetting resin which is the chain-extended reaction product of certain di ortho-substituted bismaleimides such as 1,2-bis(2-maleimidophenylthio)ethane with polyhydric phenols and which contains no third component. Yet another embodiment is the cured resin resulting from thermal treatment of the preceding thermosetting resin. Other embodiments will become clear from the ensuing description.

DESCRIPTION OF THE INVENTION

Our invention arises from the unprecedented observation that a class of di ortho-substituted BMIs undergoes Michael addition with polyhydric phenols in a reaction uncatalyzed by any third component and in the absence of any base catalyst to yield chain-extended bismaleimides as reaction products. The chain-extended BMIs are thermosetting resins having an extended pot life and therefore having an increased processing window relative to non-extended BMIs. The polymers from the fully cured chain-extended resins have not only improved fracture toughness, but also have a more favorable dielectric constant and dielectric loss factor, neither of which are predictable.

The BMI monomers used in the practice of our invention are those taught in U.S. Pat. No. 4,464,520 and which have the formula

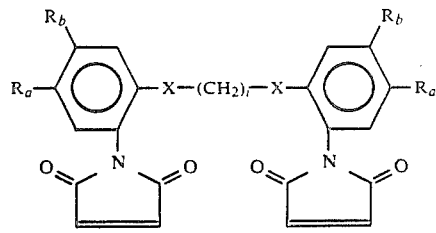

where $R_a$ and $R_b$ each independently is hydrogen, an alkyl or alkoxy group containing up to 4 carbon atoms, chlorine, or bromine, or $R_a$ and $R_b$ together form a fused 6 membered hydrocarbon aromatic ring, with the proviso that $R_a$ and $R_b$ are not t-butyl or t-butoxy, where X is O, S, or Se, i is 1–3, and the alkylene bridging group is optionally substituted by 1–3 methyl groups or by fluorine. In a preferred embodiment $R_a = R_b = H$, especially where $X = S$, and particularly where $X = S$ and $i = 2$. In the most favored embodiment the bismaleimide is 1,2-bis(2-maleimidophenylthio)ethane.

The bismaleimide monomers are reacted in the absence of a third component as a catalyst via Michael addition of the carbon-carbon double bonds of the BMI with the hydroxyl groups of a polyhydric phenol acting as a chain extender. By "polyhydric phenol" is meant a compound having at least 1 aromatic ring and having at least 2 hydroxyl groups attached to the aromatic ring(s) in the compound. The most important class of polyhydric phenols is that of dihydric phenols, and within this class the subset of broadest availability is that of the resorcinols, i.e., 1,3 dihydroxybenzenes optionally substituted with one or more alkyl groups on the aromatic ring, particularly where the alkyl group contains from 1 through about 6 carbon atoms. Examples include 2-methylresorcinol, 4-methylresorcinol, 5-methylresorcinol 6-methylresorcinol, 4-ethylresorcinol, 4-propylresorcinol, 5-pentylresorcinol, 5-hexylresorcinol, 2,4-dimethylresorcinol, 2,5-dimethylresorcinol, 4,5-dimethylresorcinol, 4,6-di-methylresorcinol, and so forth.

Although the 1,3-dihydroxybenzenes may be the most widely available class of dihydroxybenzenes, nonetheless the 1,2-dihydroxybenzenes (pyrocatechols) and 1,4-dihydroxybenzenes (hydroquinones) also are suitable dihydric phenols in the practice of this invention. Illustrative examples include pyrocatechol, 3-methylpyrocatechol, 4-methylpyrocatechol, the ethylpyrocatechols, propylpyrocatechols, butylpyrocatechols, pentylpyrocatechols, hexylpyrocatechols, hydroquinone, the alkyl-substituted hydroquinones where the alkyl group contains from 1 through 6 carbon atoms, the dialkyl-substituted hydroquinones, and so on.

Another class of dihydric phenols is that of the dihydroxynaphthalenes where the hydroxyl groups may be on the same or on different rings. Illustrative members of this class include 1,2-dihydroxynaphthalene, 1,3-dihydroxy-naphthalene, 1,4-dihydroxynaphthalene, 1,5-dihydroxynaphthalene, 1,6-di-hydroxynaphthalene, 1,7-dihydroxynaphthalene, 1,8-dihydroxynaphthalene, 2,3-dihydroxynaphthalene, 2,5-dihydroxynaphthalene, 2,6-dihydroxy-naphthalene, etc.

Another important class of dihydric phenols used in this invention is that given by the formula

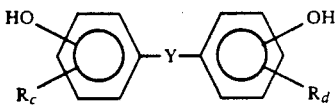

where Y is a covalent bond or Y is selected from the group consisting of $CH_2$, $C=O$, $C(CH_3)_2$, $C(CF_3)_2$, $O$, $S$, $SO_2$, $SO$, and where $R_c$, $R_d$ are hydrogen or alkyl groups containing from 1 through 6 carbon atoms. An important subgroup is that where Y is a covalent bond, that is, where the 2 aromatic rings are directly joined. Members of this class are illustrated by 4,4'-dihydroxydiphenyl, 3,3'-dihydroxydiphenyl, and similar dihydroxydiphenyls. Another important subgroup is that where Y is $C(CH_3)_2$ or $C(CF_3)_2$. In the simplest case, where $R_c=R_b=H$, such materials are commonly referred to as bisphenol A and hexafluorobisphenol A. Other members of the group encompassed by the aforegoing formula include 4,4'-thiodiphenol, bis-(hydroxyphenyl)ether, bis(hydroxyphenyl)sulfoxide, bis(hydroxyphenyl)sulfone, and bis(hydroxyphenyl)methane.

Among the phenols which are at least trihydric may be mentioned tetraphenolethane (1,1,2,2-tetrakis(hydroxyphenyl)ethane), 1,1,1-tris(hydroxy-phenyl)ethane, tris(hydroxyphenyl)methane, tetrakis(hydroxyphenyl)methane, 1,3,5-tris(hydroxyphenyl)benzene, 1,3,5-trihydroxybenzene, and the phenol-formaldehyde condensation products commonly known in the trade as Novolacs and having the formula

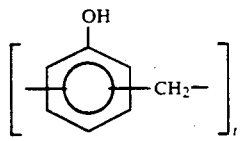

where t is 3 to 20.

The polyhydric phenol will be used in a molar proportion relative to the bismaleimide as little as about 0.05 and as great as about 2. That is, the molar ratio of BMI to polyhydric phenol used in the preparation of the chain-extended BMI may be as great as 20:1 or as little as 0.5:1. Quite often little change is seen in the resulting product when less than about 0.1 molar proportion of polyhydric phenol is employed, and the glass transition temperature often is adversely affected when more than 1 molar proportion is employed. Consequently a molar proportion of polyhydric phenol relative to BMI which is preferred in the practice of our invention is from about 0.1 to about 1.0.

The chain extension reaction is carried out rather simply. The bismaleimide and polyhydric phenol are mixed in a molar proportion from about 20:1 to about 1:1 and are reacted generally in a fluid melt state to achieve homogeneity. A temperature between about 160°-170° C. ordinarily will suffice, although an even lower temperature may be adequate where a fluid melt state can be achieved. When the reaction is complete the mixture is allowed to cool and solidify to afford a near quantitative yield of chain-extended bismaleimides.

The resulting chain-extended BMIs begin to undergo thermal polymerization in the range from about 170° C. up to at least 250° C. However, polymerization peaks at a temperature between about 250° C. up to at least 320° C. Thermal curing is perhaps most preferably done in an inert atmosphere, such as nitrogen.

As the data in the following examples will show, the dielectric constant and loss factors for our chain-extended BMIs are superior to those of either the non-extended BMI or to a typical diamine chain-extended BMI. The coefficient of thermal expansion of all of our cured chain-extended BMIs are comparable to the parent or diamine chain-extended BMIs, as are water and methylene chloride absorption properties. Flexural data show that polyhydric phenol chain extension has reduced brittleness and improved toughness of the cured resin over that of the cured non-extended BMI. The chain-extended BMIs of our invention also have broader processing windows than their diamine chain-extended counterparts, exhibiting a difference of at least 100° C. between their melting point and the onset of thermal polymerization. In summary, we have demonstrated chain extension with polyhydric phenols produces BMI resins having properties which are comparable or superior to those of diamine chain-extended counterparts, but without the complications of aromatic diamine toxicity and carcinogenicity.

The examples which follow are illustrative of our invention but should not be taken as limiting the invention in any way.

EXAMPLES

The following list is of abbreviations used throughout this section.

BPA = bisphenol A
6FBPA = hexafluorobisphenol A
TDP = 4,4'-thiodiphenol
PG = phloroglucinol
TPE = 1,1,2,2,-tetrakis(hydroxyphenyl)ethane
APO-BMI = 2,2'-bis(2-maleimidophenylthio)ethane Chain-Extension of APO-BMI with Diols. The following example illustrates the general procedure employed for the chain-extension of APO-BMI with diols. A 2-liter resin kettle was fitted with a reflux condenser, mechanical stirrer, $N_2$ inlet, drying tube, thermocouple, and a heating mantle. Under a slight positive $N_2$ flow, the empty kettle was preheated to 120° C., then a mixture of 435.1 g of APO-BMI and 64.9 g of BPA (mole ratio 3.5:1) was added over the course of 18 minutes, while maintaining mechanical stirring to facilitate melting. The fluid melt was maintained at 160°-170° C. for a period of 2 hours while being stirred under $N_2$. The clear homogeneous reaction melt was poured into an enameled steel tray, and allowed to cool and solidify. The yield of resin was >95%.

Using the same procedure, reagents and proportions were varied to produce the various APO-BMI/BPA, APO-BMI/TDP, and APO-BMI/6FBPA systems cited.

Curing Diol Chain-Extended APO-BMI Resins. Small (5-10 g) samples of diol chain-extended APO-BMI resins were weighed into 57 mm diameter aluminum weighing dishes. The samples were placed into $N_2$-purged ovens, and heated to 175° C.; fluid melts resulted. The samples were cured at 175° C. under $N_2$ for 24 hours, then the temperature was increased to 240° C., and the samples were cured at this temperature under $N_2$ for an additional 24 hours. It is recognized that these curing times are excessive, and that shorter cure times may be employed.

Extraction of Cured Diol Chain-Extended APO-BMI Resin. In order to demonstrate that the diols and polyols employed in the above examples are not merely trapped as inert fillers in a matrix of cured APO-BMI, the following experiments were performed: A sample of APO-BMI/BPA (6.7:1 weight ratio, 3.5:1 mole ratio) amounting to 1.4005 grams was crushed to small particles, and then was suspended in 50 mL of $CH_2Cl_2$. After standing at room temperature for two weeks, the mixture was finally refluxed for 18 hours. The solids were recovered from the hot mixture by filtration. After drying in air for 1 hour, the solids were re-weighed: 1.4360 grams were obtained—an increase in weight of 2.2 weight % due to uptake of $CH_2Cl_2$ (see "Methylene Chloride Uptake" below). Evaporation of solvent from the above filtrate yielded only 0.0090 grams of oily residue (0.6 weight based on starting APO-BMI/BPA).

Under the same treatment, a 1.400 gram sample of BPA dissolved completely in 50 mL of $CH_2Cl_2$, and was recovered by evaporation of the filtered $CH_2Cl_2$ solution.

Thus, it is seen that diols cannot be recovered from cured chain-extended APO-BMI resins, indicating that they have been incorporated by chemical reaction.

Chain-Extension and Curing of APO-BMI with Polyols. Because PG and TPE are polyfunctional, it was anticipated that they would quickly yield infusible crosslinked gels. Therefore, chain-extension and curing were combined in a single step. Observation of the melt behavior of these systems suggests that the two steps could have been conducted separately, however. The following procedure, describing chain-extension with TPE, is general.

APO-BMI (6.7 g) and TPE (1.0 g) mole ratio 3.1:1, were mixed in a 57 mm diameter aluminum weighing dish. The mixture was placed into a $N_2$-purged oven, and heating was begun. At a temperature of 130° C., the mixture began to melt, and at 165° C. a fluid, clear melt was obtained. After 1 hour at 180° C,, the resin was still a free-flowing melt. The resin was cured at 180°-190° C. for 18 hours. The temperature was raised to 240° C. under $N_2$ for 8½ hours. It is recognized that these cure times are excessive and that shorter cure times may be employed.

Thermal Analyses. Both DSC (differential scanning calorimetry) and TGA (thermogravimetric analysis) were performed using a DuPont Model 9900 Thermal Analysis system. DSC analyses of uncured resins were conducted at T=5° C./min under $N_2$, and cured resins were analyzed at T=10° C./min under $N_2$. All TGA analyses were conducted at T=10° C./min in air. Coefficients of thermal expansion (CTE) were determined using a Mettler TA-3000 Thermal Mechanical Analysis system.

Electrical Analysis. Dielectric constants ($\epsilon'$) and loss factors ($\tan\delta$) were determined using a Digibridge system at 1MHz and 23° C. Samples were preequilibrated at 0% and 50% relative humidity prior to testing.

Mold Curing. Resin formulations were placed into beakers, which were then placed into vacuum ovens purged with $N_2$. The samples were heated to 150°-160° C. to give fluid melts. The melts were degassed under vacuum at 160° C. for 30–60 minutes. Vacuum was released and was replaced by a $N_2$ purge, and the degassed melted resins were poured into silicone rubber flexural modulus molds. The resin-filled molds were placed into an $N_2$-purged oven which was preheated to 175° C. The samples were cured at 175° C. for 24 hours. The samples were removed from the molds, and were further cured free-standing at 240° C. under $N_2$ for 24 hours. Samples were allowed to cool to room temperature slowly to prevent cracking.

Flexural Properties. Flexural properties of cured APO-BMI and APO-BMI/BPA (mole ratio 3.5:1) were determined by the 4 point bend test at room temperature following ASTM-D790. A loading span of 1.016", and a support span of 2.032" were used.

The results of these determinations are shown in Table 4. These results show that the flexural stress, flexural strain, and flexural modulus values obtained for APO-BMI/BPA are superior to those obtained for APO-BMI alone. These results are another clear indication that chain-extension has occurred. If the BPA had merely been entrapped as an inert filler in a matrix of cured APO-BMI, the flexural property values for APO-BMI/BPA would have been lower than those of APO-BMI alone.

Water Uptake. Samples of cured resins were weighed before and after being suspended in a large excess of refluxing distilled water for 24 hours.

Methylene Chloride Uptake. Samples of cured resins were weighed before and after being suspended in a large excess of $CH_2Cl_2$ maintained at room temperature for 72 hours.

Tables 1–4 summarize some salient characteristics of chain extended resins and the cured resins therefrom.

TABLE 1

DSC Characterization of Uncured Diol/Polyol Chain-Extended APO-BMI Resins

| Diol/Poly | APO-BMI/Diol/Polyol Wt. Ratio (mole ratio) | $T_M$°C.[a] | $\Delta H^d$polym Onset, °C. | Peak, °C. | Total J/g |
|---|---|---|---|---|---|
| — | — | 103 | 222 | 287 | 203 |
| BPA | 50:50 (1:1.9) | ($Tg^c$ 24) | 230 | 299 | 167 |
| BPA | 6.7:1 (3.5:1) | 95 (Tg 27) | 255 | 316 | 129 |
| TDP | 6.7:1 (3.35:1) | (Tg 25) | 220 | 311 | 278 |
| 6FBPA | 6.7:1 (5.2:1) | 40,131 | 207 | 269 | 267 |
| PG | 6.7:1 (1.3:1) | 130[b] | — | — | — |
| TPE | 6.7:1 (3.1:1) | 130[b] | — | — | — |
| TPE | 60:40 (1:1.4) | 140[b] | — | — | — |
| (MDA | 6.7:1 (3.0:1) | 50 | 175 | 250 | 180) |

[a]Melting point.
[b]Estimated from bulk curing experiments.
[c]Glass transition temperature.
[d]Heat of polymerization.

TABLE 2

Thermal Characterization of Cured Diol/Polyol Chain-Extended APO-BMI Resins

| Resin System | (Mole ratio) | Tg, °C[a] | TGA, in Air, °C 5% Wt. Loss | TGA, in Air, °C 10% Wt. Loss |
|---|---|---|---|---|
| APO-BMI | — | >300 | 385 | 390 |
| APO-BMI/BPA | 6.7:1 (3.5:1) | >300 | 373 | 375 |
| APO-BMI/TDP | 6.7:1 (3.35:1) | >300 | 348 | 355 |
| APO-BMI/6FBPA | 6.7:1 (5.2:1) | >300 | 375 | 380 |
| APO-BMI/PG | 6.7:1 (1.3:1) | >300 | 350 | 355 |
| APO-BMI/TPE | 6.7:1 (3.1:1) | >300 | 365 | 375 |
| APO-BMI/TPE | 60:40 (1:1.4) | 265 | 365 | 375 |
| APO-BMI/MDA | 6.7:1 (3.0:1.0) | 275 | 370 | 375 |

[a]glass transition temperature

TABLE 3

Physical and Electrical Properties of Cured Diol Chain-Extended APO-BMI Resins.[a]

| Resins System | Wt. ratio (mole ratio) | ε' 0% RH | ε' 50% RH | tanδ 0% RH | tanδ 50% RH | CTE[b] ppm/°C | Wt. % H₂O Uptake | Wt. % CH₂Cl₂ Uptake |
|---|---|---|---|---|---|---|---|---|
| APO-BMI | — | 3.28 | 3.60 | 0.005 | 0.028 | 67 ± 3 | 2.51 | 3.06 |
| APO-BMI/BPA | 6.7:1 (3.5:1) | 3.25 | 3.33 | 0.001 | 0.006 | 64 ± 4 | 2.51 | 1.17 |
| APO-6FBPA | 6.7:1 (5.2:1) | 3.28 | 3.36 | 0.002 | 0.001 | 82 ± 9.3 | 2.37 | 4.84 |
| APO-BMI/MDA | 6.7:1 (3.0:1) | 3.31 | 3.71 | 0.003 | 0.017 | 61 ± 5.4 | — | — |

[a]RH = relative humidity
[b]Coefficient of thermal expansion at 260°, i.e., $a_{260}$

TABLE 4

Cured Neat Resin Mechanical Properties for BPA Chain-Extended APO-BMI, Molar Ratio 3.5:1

|  | APO-BMI/BPA | APO-BMI |
|---|---|---|
| Flexural Stress, KSI | 4.46 | 2.96 |
| Flexural Strain, % | 1.40 | 0.99 |
| Flexural Modulus, KSI | 321 | 258 |

What is claimed is:

1. A method of uncatalyzed chain extension by Michaels addition of a bismaleimide with a polyhydric phenol consisting essentially of reacting in the absence of a catalyst the carbon-carbon double bonds of a bismaleimide selected from the group consisting of

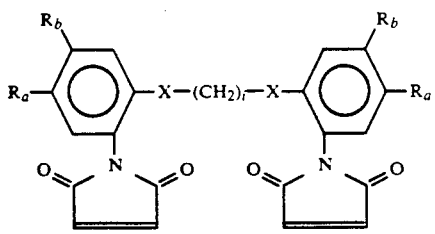

where $R_a$ and $R_b$ each independently is hydrogen, an alkyl or alkoxy group containing up to 4 carbon atoms, chlorine, or bromine, or $R_a$ and $R_b$ together form a fused 6-membered hydrocarbon aromatic ring, with the proviso that $R_a$ and $R_b$ are not t-butyl or t-butoxy, where X is O, S, or Se, i is 1–3, and the alkylene bridging group is optionally substituted by 1–3 methyl groups or by fluorine, with the hydroxyl groups of about 0.05 to about 2.0 molar proportion of a polyhydric phenol and recovering the chain-extended product.

2. The method of claim 1 where the bismaleimide is 1,2-bis(2-maleimidophenylthio)ethane.

3. The method of claim 1 where the polyhydric phenol is a dihydric phenol.

4. The method of claim 3 where the dihydric phenol is selected from the group consisting of resorcinols, pyrocatechols, hydroquinones, dihydroxynaphthalenes, and phenols of the formula

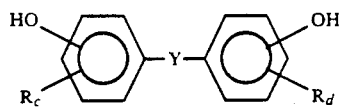

where Y is a covalent bond or Y is selected from the group consisting of CH₂, C=O, C(CH₃)₂, C(CF₃)₂, O, S, SO₂, SO, and $R_c$, $R_d$ are independently selected from the group consisting of hydrogen and alkyl or alkoxy containing from 1 to about 10 carbon atoms.

5. The method of claim 4 where the phenol has said formula where Y is a covalent bond.

6. The method of claim 4 where the phenol has the said formula where Y is C(CH₃)₂ or C(CF₃)₂.

7. The method of claim 1 where the polyhydric phenol is at least a trihydric phenol.

8. The method of claim 7 where the polyhydric phenol is selected from the group consisting of tris(hydroxyphenyl)methane, 1,1,1-tris(hydroxyphenyl)ethane, tetrakis(hydroxyphenyl)methane, 1,3,5-tris(hydroxyphenyl)benzene, 1,1,2,2-tetrakis(hydroxyphenyl)ethane, and phenolformaldehyde condensation products.

9. The method of claim 1 where the bismaleimide is reacted with from about 0.1 to about 1.0 molar proportion of the polyhydric phenol.

10. A thermosetting resin uncatalyzed reaction product by Michaels addition of the carbon-carbon double bonds of a bismaleimide selected from the group consisting of

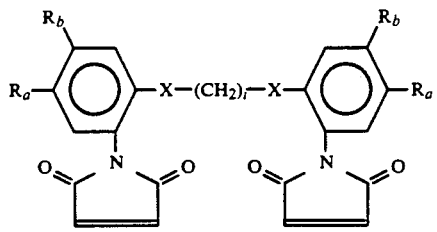

where $R_a$ and $R_b$ each independently is hydrogen, an alkyl or alkoxy group containing up to 4 carbon atoms, chlorine, or bromine, or $R_a$ and $R_b$ together form a fused 6-membered hydrocarbon aromatic ring, with the proviso that $R_a$ and $R_b$ are not t-butyl or t-butoxy, where X is O, S, or Se, i is 1–3, and the alkylene bridging group is optionally substituted by 1–3 methyl groups or by fluorine with the hydroxyl groups of 0.05 to about 2.0 molar proportion of a polyhydric phenol, said resin characterized by the absence of a base catalyst as a discrete nonreactive component and further characterized by having a difference of at least 100° C. between melting point and onset of thermal polymerization.

11. The thermosetting resin of claim 10 where the bismaleimide is 1,2-bis(2-maleimidophenylthio)ethane.

12. The thermosetting resin of claim 10 where the polyhydric phenol is a dihydric phenol.

13. The thermosetting resin of claim 12 where the dihydric phenol is selected from the group consisting of resorcinols, pyrocatechols, hydroquinones, dihydroxynaphthalenes, and phenols of the formula

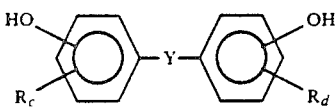

where Y is a covalent bond or Y is selected from the group consisting of $CH_2$, $C=O$, $C(CH_3)_2$, $C(CF_3)_2$, O, S, $SO_2$, SO, and $R_c$, $R_d$ are independently selected from the group consisting of hydrogen and alkyl or alkoxy containing from 1 to about 10 carbon atoms.

14. The thermosetting resin of claim 13 where the phenol has said formula where Y is a covalent bond.

15. The thermosetting resin of claim 13 where the phenol has the said formula where Y is $C(CH_3)_2$ or $C(CF_3)_2$.

16. The thermosetting resin of claim 10 where the polyhydric phenol is at least a trihydric phenol.

17. The thermosetting resin of claim 16 where the polyhydric phenol is selected from the group consisting of tris(hydroxyphenyl)methane, 1,1,1-tris(hydroxyphenyl)ethane, tetrakis(hydroxyphenyl)methane, 1,3,5-tris(hydroxyphenyl)benzene, 1,1,2,2-tetrakis(hydroxyphenyl)ethane, and phenolformaldehyde condensation products.

18. The thermosetting resin of claim 10 where the bismaleimide is reacted with from about 0.1 to about 1.0 molar proportion of the polyhydric phenol.

19. A polymer resulting from thermally curing a uncatalyzed chain-extended reaction product by Michaels addition of the carbon-carbon double bonds of a bismaleimide selected from the group consisting of

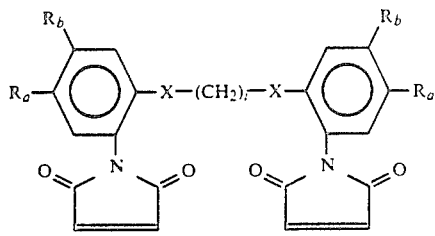

where $R_a$ and $R_b$ each independently is hydrogen, an alkyl or alkoxy group containing up to 4 carbon atoms, chlorine, or bromine, or $R_a$ and $R_b$ together form a fused 6-membered hydrocarbon aromatic ring, with the proviso that $R_a$ and $R_b$ are not t-butyl or t-butoxy, where X is O, S, or Se, i is 1-3, and the alkylene bridging group is optionally substituted by 1-3 methyl groups or by fluorine with the hydroxyl group of 0.05 to about 2.0 molar proportion of a polyhydric phenol, said resin characterized by the absence of a base catalyst as a discrete nonreactive component and further characterized by having a difference of at least 100° C. between melting point and onset of thermal polymerization.

20. The polymer of claim 19 where the bismaleimide is 1,2-bis(2-maleimidophenylthio)ethane.

21. The polymer of claim 19 where the polyhydric phenol is a dihydric phenol.

22. The polymer of claim 21 where the dihydric phenol is selected from the group consisting of resorcinols, pyrocatechols, hydroquinones, dihydroxynaphthalenes, and phenols of the formula

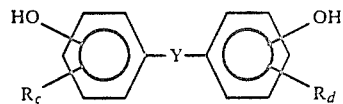

where Y is a covalent bond or Y is selected from the group consisting of, $CH_2$, $C=O$, $C(CH_3)_2$, $C(CF_3)_2$, O, S, $SO_2$, SO, and $R_c$, $R_d$ are independently selected from the group consisting of hydrogen and alkyl or alkoxy containing from 1 to about 10 carbon atoms.

23. The polymer of claim 22 where the phenol has said formula where Y is a covalent bond.

24. The polymer of claim 22 where the phenol has the said formula where Y is $C(CH_3)_2$ or $C(CF_3)_2$.

25. The polymer of claim 19 where the polyhydric phenol is at least a trihydric phenol.

26. The polymer of claim 25 where the polyhydric phenol is selected from the group consisting of tris(hydroxyphenyl)methane, 1,1,1-tris(hydroxyphenyl)ethane, tetrakis(hydroxyphenyl)methane, 1,3,5-tris(hydroxyphenyl)benzene, 1,1,2,2-tetrakis(hydroxyphenyl)ethane, and phenolformaldehyde condensation products.

27. The polymer of claim 19 where the bismaleimide is reacted with from about 0.1 to about 1.0 molar proportion of the polyhydric phenol.

* * * * *